US011886298B2

(12) United States Patent
Gautam et al.

(10) Patent No.: US 11,886,298 B2
(45) Date of Patent: Jan. 30, 2024

(54) USING A STORAGE LOG TO GENERATE AN INCREMENTAL BACKUP

(71) Applicant: Cohesity, Inc., San Jose, CA (US)

(72) Inventors: Amandeep Gautam, San Jose, CA (US); Anand Arun, San Jose, CA (US); Debasish Garai, Santa Clara, CA (US); Rupesh Bajaj, Dewas (IN); Himanshu Mehra, Mountain View, CA (US); Vairavanathan Emalayan, Vancouver (CA); Apurv Gupta, Bangalore (IN)

(73) Assignee: Cohesity, Inc., San Jose, CA (US)

( * ) Notice: Subject to any disclaimer, the term of this patent is extended or adjusted under 35 U.S.C. 154(b) by 205 days.

(21) Appl. No.: 17/218,619

(22) Filed: Mar. 31, 2021

(65) Prior Publication Data

US 2022/0318095 A1     Oct. 6, 2022

(51) Int. Cl.
*G06F 11/14* (2006.01)
*G06F 16/11* (2019.01)

(52) U.S. Cl.
CPC ........ *G06F 11/1451* (2013.01); *G06F 16/128* (2019.01)

(58) Field of Classification Search
CPC .................. G06F 16/128; G06F 11/1451
See application file for complete search history.

(56) References Cited

U.S. PATENT DOCUMENTS

| 5,522,037 | A | * | 5/1996 | Kitagawa | G06F 11/1469 |
| | | | | | 714/E11.122 |
| 6,434,681 | B1 | | 8/2002 | Armangau | |
| 6,981,114 | B1 | | 12/2005 | Wu | |
| 7,925,631 | B1 | | 4/2011 | Thillai | |
| 8,412,688 | B1 | | 4/2013 | Armangau | |
| 9,501,487 | B1 | * | 11/2016 | Yuan | G06F 16/128 |
| 9,697,268 | B1 | | 7/2017 | Prater | |
| 10,102,144 | B2 | | 10/2018 | Sundararaman | |
| 10,324,798 | B1 | * | 6/2019 | Natanzon | G06F 11/2097 |
| 10,621,049 | B1 | * | 4/2020 | Certain | G06F 16/27 |
| 10,761,941 | B1 | | 9/2020 | Redko | |
| 10,853,182 | B1 | * | 12/2020 | Vig | G06F 16/23 |
| 11,556,501 | B2 | | 1/2023 | Pogde | |
| 2004/0260726 | A1 | | 12/2004 | Hrle | |

(Continued)

*Primary Examiner* — Pierre M Vital
*Assistant Examiner* — Jedidiah P Ferrer
(74) *Attorney, Agent, or Firm* — Van Pelt, Yi & James LLP (57) ABSTRACT

An identification of a new primary snapshot created for a primary storage system is received. A threshold time window based on a capture time associated with the new primary snapshot is determined. Entries of a storage log of the primary storage system occurring within the threshold time window are analyzed to identify any objects of the primary storage system that have changed during the threshold time window. Changed objects to capture in a new secondary backup stored at a secondary storage system and corresponding to the new primary snapshot are identified. Metadata of the new primary snapshot and metadata of a previous secondary backup are compared to determine for each of the objects of the primary storage system identified as having changed during the threshold time window whether a change to an object since the previous secondary backup is captured in the new primary snapshot.

16 Claims, 5 Drawing Sheets

(56) References Cited

U.S. PATENT DOCUMENTS

| | | | |
|---|---|---|---|
| 2005/0182953 A1* | 8/2005 | Stager | G06F 11/1446 |
| | | | 713/189 |
| 2007/0266062 A1* | 11/2007 | Young | G06F 16/113 |
| | | | 707/999.204 |
| 2008/0168567 A1 | 7/2008 | Hahn | |
| 2009/0300080 A1* | 12/2009 | Stringham | G06F 11/1451 |
| | | | 707/999.204 |
| 2012/0124649 A1 | 5/2012 | Zhao | |
| 2013/0132346 A1* | 5/2013 | Varadarajan | G06F 11/1448 |
| | | | 707/639 |
| 2014/0089264 A1 | 3/2014 | Talagala | |
| 2015/0227575 A1* | 8/2015 | Jaquette | G06F 16/11 |
| | | | 707/645 |
| 2016/0364156 A1 | 12/2016 | Haustein | |
| 2019/0026187 A1* | 1/2019 | Gulam | G06F 16/128 |
| 2020/0125531 A1 | 4/2020 | Troshin | |

\* cited by examiner

USING A STORAGE LOG TO GENERATE AN INCREMENTAL BACKUP

BACKGROUND OF THE INVENTION

A primary system may be comprised of one or more client devices connected to a storage system (e.g., network-attached storage (NAS)) via a network. A full or incremental backup of the storage system may be generated and data included in the backup is backed up from the storage system to a backup system. The storage system may store a large number of directories and files (e.g., millions, billions, etc.). When an incremental backup of the storage system is generated, files and/or directories that have changed (e.g., created, modified, moved and/or deleted) are identified. The changed files and/or changed directories may be identified by traversing the entire directory structure associated with the storage system. A full directory traversal inspects all the directories and files in a volume. This is a resource and time intensive process. The number of changed files and/or changed directories associated with an incremental backup may be small (e.g., less than a change threshold). In this scenario, traversing the entire directory structure associated with the storage system to identify the changed files and/or changed directories is inefficient.

BRIEF DESCRIPTION OF THE DRAWINGS

Various embodiments of the invention are disclosed in the following detailed description and the accompanying drawings.

DETAILED DESCRIPTION

Techniques to generate an incremental backup of a primary storage system are disclosed. The primary storage system includes a storage device (e.g., NAS device) that is configured to generate snapshots of the data stored in a storage volume of the primary storage system. A primary snapshot captures a state of a file system at a point in time. For example, the primary snapshot may be a read-only image of a storage volume of the primary storage system.

The primary storage system is configured to maintain a storage log (e.g., audit log) for compliance purposes. The primary storage system maintains and updates the storage log anytime an object (e.g., file or directory) is accessed, modified, deleted, or created. An entry in the storage log corresponds to one of the objects and includes information, such as a timestamp, an event type (e.g., read, write, delete, create, move, change owner, change permissions, etc.), a file path, a filename, a directory name, a directory path, a user associated with the event, a file associated with the event, an identification of a device used, an object identifier which may or may not be unique, etc. The storage log may include other events associated with the primary storage system, such as when a user logged in, the number of failed login attempts associated with a device, the last time a software update was performed, the last time a password was changed, etc. Events stored in the storage log are stored in chronological order or may be sorted to be in chronological order.

Instead of traversing the entire file directory structure of the primary storage system to generate an incremental backup, a selective directory traversal of the file directory structure of a primary snapshot is performed to reduce the amount of time and resources needed to generate the incremental backup. The file directory structure of the primary snapshot is traversed instead of the file directory structure of the primary storage system because the file directory structure of the primary snapshot represents the file directory structure at a particular point in time whereas the file directory structure of the primary storage system is a live directory structure that may change over time.

The storage log is analyzed to identify changed objects (e.g., a changed file, a change to metadata associated with a file, a created file, a deleted file, a moved file, a new directory, a deleted directory, a moved directory, a change to metadata associated with a directory, etc.) that are to be included in the incremental backup. The primary snapshots generated by a primary storage system, such as a NAS device, have corresponding timestamps and the events stored in the storage log have corresponding timestamps. The point in time at which a primary snapshot was performed (e.g., the capture time associated with the primary snapshot) is not reflected in the storage log. Directly comparing the timestamps in the storage log with the timestamp of the primary snapshot to identify changed objects is problematic because of possible disparities between the clocks used to generate those timestamps, which may not be well synchronized. Thus, merely including in the incremental backup, identified changed objects determined by comparing the timestamps in the storage log with the timestamp of the previous primary snapshot may lead to data integrity issues because clock skew may exist between a clock associated with the primary snapshot and a clock associated with the storage log. As a result, an object may be incorrectly identified as an identified changed object and included in a backup of a current primary snapshot when in fact, the identified changed object was already included in a previous secondary backup or should be included in a subsequent secondary backup. An object may also be accidentally excluded from a backup of a current primary snapshot because it was believed to already have been included in a previous secondary backup or is believed to be included in a subsequent secondary backup.

The disclosed techniques reduce the likelihood of data integrity issues when an incremental backup of a primary storage system is generated. A secondary storage system is configured to receive an indication of a new primary snapshot created for the primary storage system. The secondary storage system is configured to send to the primary storage system a request for the storage log associated with the primary storage system. In some embodiments, the request is for the entire storage log. In some embodiments, the request is for a portion of the storage log (e.g., the portion of the storage log since a last primary snapshot). The request may be sent periodically (e.g., hourly, daily, etc.) or on-demand. A threshold time window based on a capture time associated with the new primary snapshot is determined. In some embodiments, the time boundaries associated a threshold time window are based on a clock associated with a storage log. In some embodiments, the time boundaries associated a threshold time window are based on a clock associated with primary snapshots.

Figure 2A:
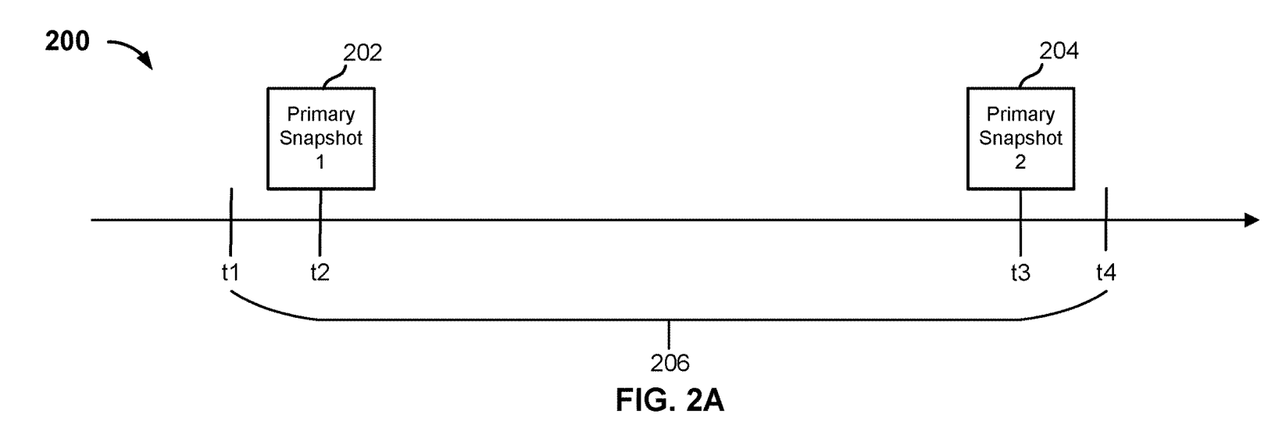
FIG. 2A is a diagram illustrating an embodiment of a timeline associated with an incremental backup in accordance with some embodiments.

In some embodiments, the threshold time window boundaries include a pre-previous primary snapshot marker (e.g., t1 of FIG. 2A) and a post-new primary snapshot marker (e.g., t4 of FIG. 2A). The timestamps associated with the pre-previous primary snapshot marker and the post-new primary snapshot marker may be based on the storage log clock. The changed objects to include in the secondary backup of the new primary snapshot are determined by utilizing the storage log to identify changed objects that occurred after the pre-previous primary snapshot marker and before the post-new primary snapshot marker. Directories associated with the identified changed objects are added to a list of directories to traverse. In some embodiments, a plurality of the identified changed objects are associated with the same directory. Instead of traversing the same directory a plurality of times, the list of directories to traverse may be deduped to include a single entry that corresponds to the directory that is shared by a plurality of entries. In some embodiments, the entries are deduped in-line (e.g., while the directories are being added to the list) or after the entire list of directories to traverse is completed. The directories associated with the identified changed objects included in the new primary snapshot are traversed to verify that the identified changed objects are to be included in the secondary backup of the primary storage system. This may prevent data corruption issues when performing the secondary backup. In some embodiments, the identified changed object is a directory and a top level of the directory is traversed. In some embodiments, the identified changed object is a file and a directory that includes the file is traversed. This may include a top level that includes the file and one or more sub-levels.

Figure 2B:
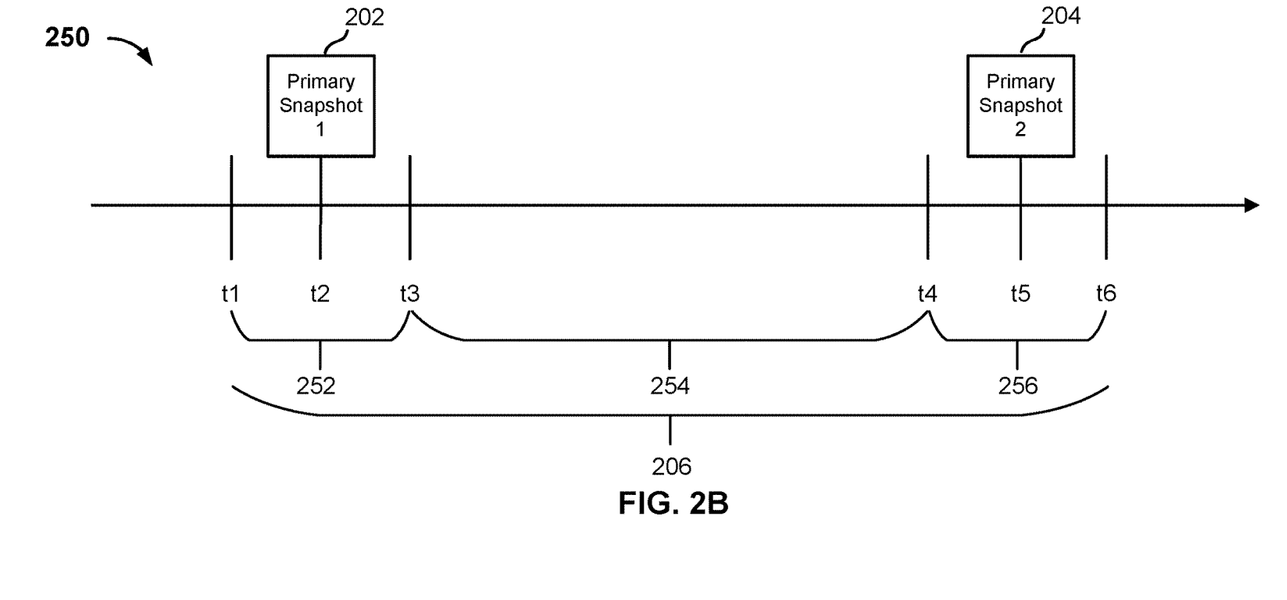
FIG. 2B is a diagram illustrating an embodiment of a timeline associated with an incremental backup in accordance with some embodiments.

For example, based on comparing the timestamp of the new primary snapshot and the timestamp of the storage log, an event in the storage log may indicate that an object, such as a file or directory, was created at a particular point in time that occurred after a capture time associated with a previous primary snapshot (e.g., primary snapshot 202 of FIGS. 2A, 2B). However, due to discrepancies between the snapshot service clock and the storage log clock, it is not clear if the event is associated with the new primary snapshot. A directory associated with the created object included in the new primary snapshot (e.g., primary snapshot 204 of FIGS. 2A, 2B) may be traversed to verify that the created object is present in the new primary snapshot. In some embodiments, the created object is a directory and a top level of the directory is traversed. In some embodiments, the created object is a file and a directory that includes the file is traversed. If the object is not included in the directory (e.g., the top level of the directory does not exist or the file does not exist) and there are no other entries related to that object in the storage log, then the new primary snapshot was generated before the event (e.g., the event occurred after t3 of FIG. 2A or after t5 of FIG. 2B) and the new object is not included in the secondary backup of the primary storage system. If the created object is included in the directory (e.g., the top level of the directory exists or the file exists in the directory) and there are no other entries related to that object in the storage log, then the new primary snapshot was generated after the event (e.g., before t3 of FIG. 2A or before t5 of FIG. 2B).

However, it is not clear if the object was created before the previous primary snapshot (e.g., between t1 and t2 of FIGS. 2A, 2B) or after the previous primary snapshot (e.g., between t2 and t3 of FIG. 2A or between t2 and t5 of 2B). That is, it is not clear if the object should be included in the secondary backup. A secondary backup corresponding to the previous primary snapshot may be analyzed to determine if the object was created before the previous primary snapshot or after the previous primary snapshot. If the created object is included in the secondary backup corresponding to the previous primary snapshot and there are no other delete, move, or create entries associated with the object in the storage log, then the object was created before the previous primary snapshot and should not be included in a secondary backup of the new primary snapshot. If the created object is not included in the secondary backup corresponding to the previous primary snapshot, then the object was created after the previous primary snapshot and should be included in the secondary backup of the new primary snapshot.

In another example, based on comparing the timestamp of the new primary snapshot and the timestamp of the storage log, an event in the storage log may indicate that an object was deleted at a particular point in time that occurred after a capture time associated with a previous primary snapshot. A directory associated with the object included in the new primary snapshot may be traversed (i.e., either the directory itself or the directory of a file) to verify that the object is not present in the new primary snapshot. If the object is included in the directory, then the new primary snapshot was generated before the event (e.g., the object was deleted after t3 of FIG. 2A, deleted after t5 of FIG. 2B, or deleted before t2 of FIGS. 2A, 2B so long as there are not subsequent create operations for an object having the same name as the deleted object) and a changed object indicating the object deletion would not be included in a change list corresponding to the secondary backup of the new primary snapshot. If the object is not included in the directory, then the new primary snapshot was generated after the event (e.g., the object was deleted before t3 of FIG. 2A or t5 of FIG. 2B).

However, it is unclear if the object was deleted before or after the previous primary snapshot (e.g., before or after t2 of FIGS. 2A, 2B). A secondary backup corresponding to the previous primary snapshot may be analyzed to determine if the object was deleted before the previous primary snapshot or after the previous primary snapshot. If the deleted object is included in the secondary backup corresponding to the previous primary snapshot, then the object was deleted after the previous primary snapshot and the identified changed object should be included in a change list corresponding to a secondary backup of the new primary snapshot. If the deleted object is not included in the secondary backup corresponding to the previous primary snapshot, then the object was deleted before the previous primary snapshot and the identified changed object should not be included in the change list corresponding to the secondary backup of the new primary snapshot.

The verified changed objects are aggregated in a change list. The change list indicates the objects and one or more corresponding operations to perform with respect to previously backed up versions of the objects or one or more corresponding operations to perform with respect to a new version of an object. An operation may be to create the object, delete the object, move the object, and/or modify the object (e.g., data and/or metadata). The objects included in the change list that are associated with create or modify operations are obtained and included in a secondary backup of the new primary snapshot to generate an incremental backup of the primary storage system. In some embodiments, a file is included in the change list and the file is obtained. In some embodiments, a directory is included in the change list and files included in the top level of the directory are obtained. Objects included in the change list that are associated with delete or move operations are not obtained, but an indication of the delete or move operations is stored. The secondary storage system may use the indication to update its own metadata that represents a state of the primary storage system at a point in time corresponding to the new primary snapshot.

A secondary storage system is configured to request for the changed objects included on the change list that are associated with create or modify operations. In response to the request, the primary storage system is configured to provide data and/or metadata associated with the requested changed objects. The secondary storage system is configured to back up and ingest the data and/or metadata included in the secondary backup and store the backed up data and/or metadata. Selectively traversing the file directory structure reduces the amount of time and resources needed to generate the incremental backup. Using the threshold time window to identify changed objects to include in the incremental backup reduces data integrity issues that may arise when generating an incremental backup.

In some embodiments, the amount of time and resources needed to generate the incremental backup is further reduced by selectively traversing the file directory structures for changed objects that occurred near the previous primary snapshot (e.g., within a first threshold time window (t1 to t3 of FIG. 2B)) and changed objects that occurred near the new primary snapshot (e.g., within a second threshold time window (t4 to t6 of FIG. 2B)). Directories associated with the changed objects that occurred between the first threshold time window and the second threshold time window (e.g., t3 to t4 of FIG. 2B) do not need to be traversed because the clock skew between a snapshot service clock and storage log clock is unlikely to be great enough to cause a data integrity problem for these changed objects. The changed objects that occurred between the first threshold time window and the second threshold time window have a high confidence level (e.g., confidence level greater than a threshold confidence level) that they are to be included in a secondary backup of the new primary snapshot.

The first threshold time window boundaries include a pre-previous primary snapshot marker (e.g., t1 of FIG. 2B) and a post-previous primary snapshot marker (e.g., t3 of FIG. 2B). In an example, the capture time associated with previous primary snapshot may be 12:00 AM (e.g., generated by a snapshot service clock). The pre-previous primary snapshot marker may be 11:58 PM and the post-previous primary snapshot marker may be 12:02 AM. The timestamps associated with the pre-previous primary snapshot marker and the post-previous primary snapshot marker may be based on a storage log clock.

The second threshold time window boundaries include a pre-new primary snapshot marker (e.g., t4 of FIG. 2B) and a post-new primary snapshot marker (e.g., t6 of FIG. 2B). Continuing the above example, the capture time associated with new primary snapshot may be 12:00 PM (e.g., generated by a snapshot service clock). The pre-new primary snapshot marker may be 11:58 AM and the post-new primary snapshot marker may be 12:02 PM. The timestamps associated with the pre-new primary snapshot marker and the post-new primary snapshot marker may be based on the storage log clock.

The storage log is analyzed to identify events that occurred in the first threshold time window and the second threshold time window. The identified events correspond to changed objects that may be associated with a new primary snapshot, a previous primary snapshot, or a subsequent primary snapshot. Directories associated with the identified changed objects are added to a list of directories to traverse. In some embodiments, a plurality of the identified changed objects are associated with the same directory. Instead of traversing the same directory a plurality of times, the list of directories to traverse may be deduped to include a single entry that corresponds to the directory that is shared by a plurality of entries. In some embodiments, the entries are deduped in-line (e.g., while the directories are being added to the list) or after the entire list of directories to traverse is completed. The directories associated with the changed objects corresponding to the identified events are traversed to determine whether each of the changed objects is associated with the new primary snapshot, the previous primary snapshot, or the subsequent primary snapshot. This may prevent data corruption issues when performing the secondary backup. In some embodiments, the identified changed object is a directory and a top level of the directory is traversed. In some embodiments, the identified changed object is a file and a directory that includes the file is traversed. Directories associated with changed objects included in the first threshold time window or second threshold time window are traversed because the clock skew between the snapshot service clock and storage log clock may cause a data integrity problem, that is, changed objects included in the first threshold time window or second threshold time window cannot be determined to be included in the new primary snapshot with a high confidence level (e.g., confidence level greater than a threshold confidence level) by using the timestamps of the different clocks. Changed objects that are determined to be associated with the new primary snapshot are added to a change list. The objects included in the change list that are associated with create or modify operations are obtained and included in an incremental backup of the primary storage system.

The storage log is further analyzed to identify events that occurred between the first and second threshold time windows. The identified events correspond to changed objects that are likely to have been captured by the new primary snapshot. The changed objects are aggregated in the change list. Unlike changed objects included in the first and second threshold time windows, directories associated with changed objects corresponding to the identified events that occurred between the first and second threshold time windows do not need to be traversed because the clock skew between the snapshot service clock and storage log clock is unlikely to be great enough to cause a data integrity problem.

A secondary backup of the new primary snapshot reflects the changed objects that are included in a change list. A secondary storage system is configured to request for the changed objects included on the change list that are associated with create or modify operations. In response to the request, the primary storage system is configured to provide data and/or metadata associated with the requested changed objects. The secondary storage system is configured to back up and ingest the data and/or metadata included in the secondary backup and store the backed up data and/or metadata.

Figure 1:
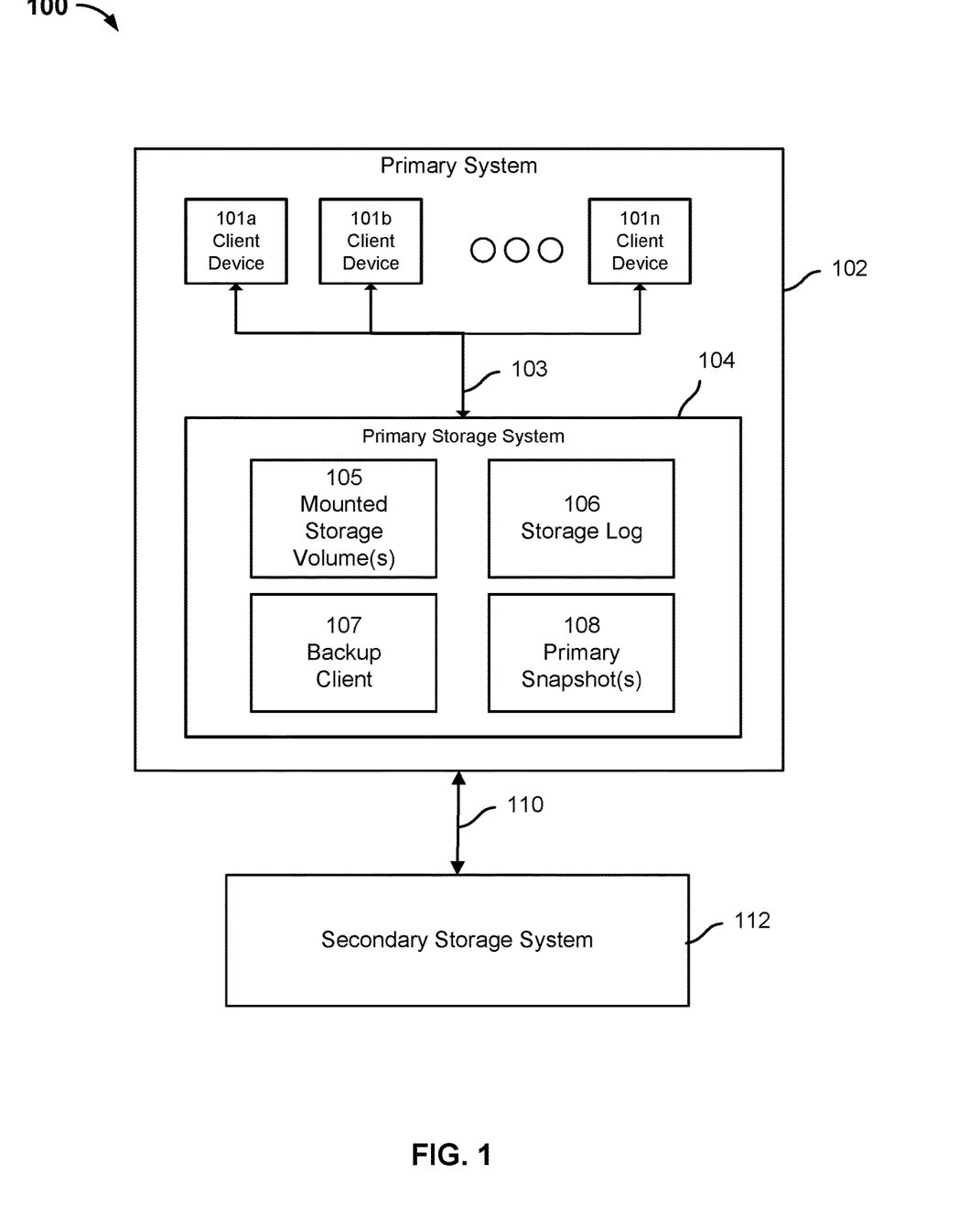
FIG. 1 is a block diagram illustrating a system for generating a backup in accordance with some embodiments.

FIG. 1 is a block diagram illustrating a system for generating a backup in accordance with some embodiments. In the example shown, system 100 is comprised of primary system 102, network 110, and secondary storage system 112.

Primary system 102 may be comprised of a plurality of client devices 101*a*, 101*b*, 101*n*, a network 103, and a primary storage system 104. Although three client devices are shown, primary system 102 may be comprised of one to n client devices. A client device may be a computing device, such as a computer, a laptop, a desktop, a tablet, a mobile device, etc. Client devices 101*a*, 101*b*, 101*n* may store one or more objects to primary storage system 104. Client devices 101*a*, 101*b*, 101*n* may access the one or more objects stored in primary storage system 104 and perform one or more file operations with respect to the one or more objects stored in primary storage system 104. A file operation may include a write operation, a read operation, a delete operation, a move operation, a creation operation, a modify metadata operation (e.g., change permissions, change ownership, etc.), etc. In some embodiments, the one or more file operations include creating a directory, deleting a directory, modifying a directory, or moving a directory, etc.

Client devices 101*a*, 101*b*, 101*n* may be connected to primary storage system 104 via network 103. Network 103 may be a local area network, a wide area network, a personal area network, a wireless local area network, a storage-area network, etc.

Primary storage system 104 may be comprised of one or more data storage servers (not shown). Primary storage system 104 may be configured to provide file-based data storage services to client devices 101*a*, 101*b*, 101*n*. For example, primary storage system 104 may be a NAS. Primary storage system 104 may include one or more mounted storage volumes 105, storage log 106 (e.g., compliance audit log), and backup client 107. The one or more mounted storage volumes 105 may store the data associated with one or more files, the metadata associated with the one or more files, data associated with one or more directories, and metadata associated with one or more directories. Storage log 106 may include a plurality of entries for the one or more mounted storage volumes 105. An entry may identify the mounted storage volume to which the entry is associated. Storage log 106 may include an entry each time an object stored in the one or more mounted storage volumes 105 is accessed, modified, moved, created, or deleted. Each entry of storage log 106 may include an associated timestamp. Primary storage system 104 may maintain a corresponding storage log for each storage device of primary storage system 104.

Storage log 106 may associate an object with a path (e.g., file path, directory path) and a name (e.g., filename, directory name), but not a unique identifier. When there are multiple events associated with an object, it may be difficult to determine whether a plurality of changes associated with an object are associated with the same object or with different objects. For example, an object having a first name may be created, deleted, and then a second object having the same name may be created.

Primary storage system 104 may be configured to generate and store one or more primary snapshots 108 of the data stored in a storage volume. In some embodiments, one of the primary snapshots 108 is deleted after a secondary backup of the primary snapshot 108 is performed. Primary snapshots 108 may be generated according to a backup policy. In some embodiments, a primary snapshot is generated periodically (e.g., hourly, bi-daily, daily, etc.). A primary snapshot is a read-only image of a storage volume of the primary storage system that captures the state of the file system at a point in time.

In some embodiments, secondary storage system 112 remotely accesses storage log 106 and requests data from primary storage system 104 in order to perform a secondary backup based on the entries included in storage log 106. Secondary storage system 112 may use a distributed file system protocol (e.g., network file system) to remotely access primary system 102 and its contents (e.g., one or more mounted storage volumes 105, storage log 106, primary snapshot(s) 108, etc.). In some embodiments, backup client 107 detects that primary snapshot 108 was generated, accesses storage log 106, and performs a secondary backup of primary snapshot 108 based on the entries included in storage log 106. In some embodiments, backup client 107 receives a command from secondary storage system 112 to perform a secondary backup of primary snapshot 108. In response to the command, backup client 107 accesses storage log 106 and performs a secondary backup of primary snapshot 108 based on the entries included in storage log 106. In some embodiments, secondary storage system 112 accesses primary system 102 via a proxy (not shown).

The secondary backup may be a full backup of primary snapshot 108 or an incremental backup of primary snapshot 108. A full backup of primary snapshot 108 includes all of the data associated with primary snapshot 108. An incremental backup of primary snapshot 108 includes data associated with primary snapshot 108 that was not previously backed up to secondary storage system 112. In some embodiments, all of the data associated with an object included in the change list is backed up to secondary storage system 112. In some embodiments, data and/or metadata associated with the object included in the change list that was not previously included in a secondary backup is backed up to secondary storage system 112.

To generate an incremental backup, a selective directory traversal of the file directory structure associated with primary snapshot 108 is performed to reduce the amount of time and resources needed to generate the incremental backup. Storage log 106 is analyzed to identify changed objects (e.g., a changed file, a change to metadata associated with a file, a created file, a deleted file, a moved file, a new directory, a deleted directory, a moved directory, etc.) that are to be included in the incremental backup. The primary snapshots 108 generated by primary storage system 104 have corresponding timestamps and the events stored in storage log 106 have corresponding timestamps. The point in time at which a primary snapshot was performed is not reflected in storage log 106. Directly comparing the timestamps in the storage log with the timestamp of the primary snapshot to identify changed objects is problematic because of possible disparities between the clocks used to generate those timestamps, which may not be well synchronized. Thus, merely including in the incremental backup, identified changed objects determined by comparing the timestamps in storage log 106 with the timestamp of the previous primary snapshot may lead to data integrity issues because clock skew may exist between a clock associated with the primary snapshots and a clock associated with storage log 106. As a result, an object may be incorrectly identified as an identified changed data object and included in a backup of a current primary snapshot when in fact, the identified changed object was already included in a previous secondary backup or should be included in a subsequent secondary backup. An object may also be accidentally excluded from a backup of a current primary snapshot because it was believed to already have been included in a previous secondary backup or is believed to be included in a subsequent secondary backup.

In some embodiments, secondary storage system 112 requests primary storage system 104 to create a new primary snapshot. In some embodiments, primary storage system 104 creates the new primary snapshot without a request from secondary storage system 112. Secondary storage system 112 is configured to receive an indication of a new primary snapshot created for primary storage system 104. Secondary storage system 112 is configured to send to primary storage system 104 a request for storage log 106. The request may be sent periodically (e.g., hourly, daily, etc.) or on-demand. In some embodiments, secondary storage system 112 accesses a storage location of storage log 106 and mounts storage log 106. A threshold time window based on a capture time associated with the new primary snapshot is determined.

In some embodiments, the threshold time window boundaries include a pre-previous primary snapshot marker (e.g., t1 of FIG. 2A) and a post-new primary snapshot marker (e.g., t4 of FIG. 2A). The timestamps associated with the pre-previous primary snapshot marker and the post-new primary snapshot marker are based on the storage log clock. The changed objects to include in the secondary backup of the new primary snapshot are determined by utilizing storage log 106 to identify changed objects that occurred after the pre-previous primary snapshot marker and before the post-new primary snapshot marker. Directories associated with the identified changed objects are added to a list of directories to traverse. In some embodiments, a plurality of the identified changed objects are associated with the same directory. Instead of traversing the same directory a plurality of times, the list of directories to traverse may be deduped to include a single entry that corresponds to the directory that is shared by a plurality of entries. In some embodiments, the entries are deduped in-line (e.g., while the directories are being added to the list) or after the entire list of directories to traverse is completed. The directories associated with the identified changed objects included in the new primary snapshot are traversed to verify that the identified changed objects are to be included in the secondary backup of the primary storage system. In some embodiments, the identified changed object is a directory and a top level of the directory is traversed. In some embodiments, the identified changed object is a file and a directory that includes the file is traversed.

The verified changed objects are aggregated in a change list. The change list indicates the objects and one or more corresponding operations to perform to previously backed up versions of objects or one or more corresponding operations to perform with respect to a new version of an object. The operation may be to create the object, delete the object, move the object, and/or modify the object (e.g., data and/or metadata). The objects included in the change list that are associated with create or modify operations are obtained and included in a secondary backup of the new primary snapshot to generate an incremental backup of the primary storage system 104. Objects included in the change list that are associated with delete or move operations are not obtained, but an indication of the delete or move operations is stored. The secondary storage system may use the indication to update its own metadata that represents a state of the primary storage system at a point in time corresponding to the new primary snapshot.

Secondary storage system 112 is configured to back up and ingest, via connection 110, the data included in the secondary backup and store the backed up data. Connection 110 may be a wired connection or a wireless connection. Connection 110 may be a LAN, WAN, intranet, the Internet, or a combination thereof. Selectively traversing the file directory structure reduces the amount of time and resources needed to generate the incremental backup. Using the threshold time window to identify changed objects to include in the incremental backup reduces data integrity issues that may arise when generating an incremental backup.

In some embodiments, the amount of time and resources needed to generate the incremental backup is further reduced by selectively traversing the file directory structures for changed objects that occurred near the previous primary snapshot (e.g., within a first threshold time window) and changed objects that occurred near the new primary snapshot (e.g., within a second threshold time window). Directories associated with the changed objects that occurred between the first threshold time window and the second threshold time window may not need to be traversed because the clock skew between the snapshot service clock and storage log clock is unlikely to be great enough to cause a data integrity problem for these changed objects. The changed objects that occurred between the first threshold time window and the second threshold time window have a high confidence level (e.g., confidence level greater than a threshold confidence level) that they are to be included in a secondary backup of the new primary snapshot.

The first threshold time window boundaries include a pre-previous primary snapshot marker (e.g., t1 of FIG. 2B) and a post-previous primary snapshot marker (e.g., t3 of FIG. 2B). In an example, the capture time associated with a previous primary snapshot may be 12:00 AM (e.g., generated by a snapshot service clock). The pre-previous primary snapshot marker may be 11:58 PM and the post-previous primary snapshot marker may be 12:02 AM. The timestamps associated with the pre-previous primary snapshot marker and the post-previous primary snapshot marker may be based on a storage log clock.

The second threshold time window boundaries include a pre-new primary snapshot marker (e.g., t4 of FIG. 2B) and a post-new primary snapshot marker (e.g., t6 of FIG. 2B). Continuing the above example, the capture time associated with a new primary snapshot may be 12:00 PM (e.g., generated by a snapshot service clock). The pre-new primary snapshot marker may be 11:58 AM and the post-new primary snapshot marker may be 12:02 PM. The timestamps associated with the pre-new primary snapshot marker and the post-new primary snapshot marker may be based on the storage log clock.

Storage log 106 is analyzed to identify events that occurred in the first threshold time window and the second threshold time window. The identified events correspond to changed objects that may be associated with a new primary snapshot, a previous primary snapshot, or a subsequent primary snapshot. Directories associated with the identified changed objects are added to a list of directories to traverse. In some embodiments, a plurality of the identified changed objects are associated with the same directory. Instead of traversing the same directory a plurality of times, the list of directories to traverse may be deduped to include a single entry that corresponds to the directory that is shared by a plurality of entries. In some embodiments, the entries are deduped in-line (e.g., while the directories are being added to the list) or after the entire list of directories to traverse is completed. The directories associated with the changed objects corresponding to the identified events are traversed to determine whether each of the changed objects is associated with the new primary snapshot, the previous primary snapshot, or the subsequent primary snapshot. In some embodiments, the identified changed object is a directory and a top level of the directory is traversed. In some embodiments, the identified changed object is a file and a directory that includes the file is traversed. Directories associated with changed objects included in the first threshold time window or second threshold time window are traversed because the clock skew between the snapshot service clock and storage log clock may cause a data integrity problem, that is, changed objects included in the first threshold time window or second threshold time window cannot be determined to be included in the new primary snapshot with a high confidence level (e.g., confidence level greater than a threshold confidence level) by using the timestamps of the different clocks. Changed objects that are determined to be associated with the new primary snapshot are added to a change list. The objects included in the change list that are associated with create or modify operations are obtained and included in an incremental backup of the primary storage system 104.

Storage log 106 is further analyzed to identify events that occurred between the first and second threshold time windows. The identified events correspond to changed objects that are likely to have been captured by the new primary snapshot. The changed objects are aggregated in the change list. Unlike changed objects included in the first and second threshold time windows, directories associated with changed objects corresponding to the identified events that occurred between the first and second threshold time windows may not need to be traversed because the clock skew between the snapshot service clock and storage log clock is unlikely to be great enough to cause a data integrity problem.

A secondary backup of the new primary snapshot reflects the changed objects that are included in a change list. Secondary storage system 112 is configured to request the changed objects included in the change list that are associated with create or modify operations. In response to the request, primary storage system 104 is configured to provide data and/or metadata associated with the requested changed objects or provide access to the objects. Secondary storage system 112 is configured to back up and ingest the data included in the secondary backup and store the backed up data.

Secondary storage system 112 may be comprised of one or more storage nodes. In some embodiments, a node of secondary storage system 112 includes a processor, memory, and a plurality of storage devices. The plurality of storage devices may include one or more solid state drives, one or more hard disk drives, or a combination thereof. The backed up data may be stored in the one or more solid state drives, one or more hard disk drives, or a combination thereof.

In some embodiments, a node of secondary storage system 112 includes a processor and memory, and is coupled to a separate storage device. The separate storage device may include one or more storage devices (e.g., flash storage devices). A storage device may be segmented into a plurality of partitions. Each of the nodes may be allocated one or more of the partitions. The one or more partitions allocated to a node may be configured to store data associated with some or all of the changed objects that were backed up to secondary storage system 112. For example, the separate storage device may be segmented into 10 partitions and secondary storage system 112 may include 10 nodes. A node of the 10 nodes may be allocated one of the 10 partitions.

In some embodiments, a node of secondary storage system 112 includes a processor, memory, and a storage device. The node may be coupled to a separate storage device. The separate storage device may include one or more storage devices. A storage device may be segmented into a plurality of partitions. Each of the nodes may be allocated one or more of the partitions. The one or more partitions allocated to a node may be configured to store data associated with some or all of the changed objects that were backed up to secondary storage system 112. For example, the separate storage device may be segmented into 10 partitions and secondary storage system 112 may include 10 nodes. A node of the 10 nodes may be allocated one of the 10 partitions.

In some embodiments, the nodes are homogenous nodes where each node has the same capabilities (e.g., processing, storage, memory, etc.). In some embodiments, at least one of the nodes is a heterogeneous node with different capabilities (e.g., processing, storage, memory, etc.) than the other nodes of secondary storage system 112.

FIG. 2A is a diagram illustrating an embodiment of a timeline associated with an incremental backup in accordance with some embodiments. In the example shown, timeline 200 illustrates a first primary snapshot 202 being taken at time t2 and a second primary snapshot 204 being taken at time t3.

A storage log associated with a primary storage system may be utilized to generate an incremental backup of the primary storage system. An incremental backup of the primary storage system includes objects that have changed since a previous backup (full or incremental). Other systems may traverse an entire file directory structure to identify changed objects to include in the incremental backup. However, this is a time and resource intensive process. The amount of time and resources needed to identify the changed objects to include in the incremental backup may be reduced by performing a selective file directory traversal associated with the identified changed items.

The primary storage system includes a service that is configured to generate primary snapshots. The snapshot service is associated with a corresponding clock. A capture time associated with the first primary snapshot (t2) and a capture time associated with the second primary snapshot (t3) are based on the snapshot service clock. The point in time at which a primary snapshot was performed (e.g., the capture time associated with the primary snapshot) is not reflected in the storage log. Directly comparing the timestamps in the storage log with the timestamp of the primary snapshot to identify changed objects is problematic because of possible disparities between the clocks used to generate those timestamps, which may not be well synchronized. Thus, merely including in the incremental backup, identified changed objects that occurred after the timestamp associated with a previous primary snapshot (e.g., identified changed objects occurring between t2 and t3) may lead to data integrity issues because clock skew may exist between a clock associated with the primary snapshots and a clock associated with the storage log.

A storage log of the primary storage system may be used to identify the objects that have changed since the previous backup. The storage log stores a plurality of events, each of the events has an associated timestamp. An event timestamp is based on a clock associated with the storage log, which is different than the snapshot service clock. Since clock skew may exist between the snapshot service clock and the storage log clock, it is not clear whether an event with a timestamp that occurred near a primary snapshot timestamp occurred before or after the primary snapshot. For example, a capture time associated with a primary snapshot may be 12:00:00 PM. A timestamp associated with an event included in a storage log may be 12:00:05 PM. Due to clock skew, it is not clear whether the primary snapshot occurred before or after the event.

In the example shown, an incremental backup of the primary storage system is generated based on the primary snapshot 204. A threshold time window 206 is determined. The timestamps of the boundaries of threshold time window 206 (e.g., t1 and t4) are based on a clock associated with the storage log. The threshold time window 206 includes events that are likely associated with the second primary snapshot 204. Some of the events included in threshold time window 206 are associated with the second primary snapshot 204. Some of the events included in threshold time window 206 may be associated with the first primary snapshot 202. Some of the events included in threshold time window 206 may be associated with a third primary snapshot to be performed at a later time (not shown).

To determine whether an event included in threshold time window 206 is associated with the first primary snapshot 202, the second primary snapshot 204, or should be associated with a third primary snapshot to be performed at a later time, the storage log is analyzed to identify changed objects having a timestamp that is within the threshold time window 206. For each identified changed object, a directory associated with the identified changed object in the second primary snapshot 204 is traversed. In some embodiments, the created object is a directory and a top level of the directory is traversed. In some embodiments, the created object is a file and a directory that includes the file is traversed.

In the event the identified changed object is an object creation and the created object is not included in the directory (e.g., the top level of the directory does not exist or the file does not exist), then the created file may be associated with a third primary snapshot to be performed at a later time. In the event the identified changed object is an object creation, the created file may be associated with the second primary snapshot 204 or the first primary snapshot 202 if the created object is included in the directory. To verify that the created object is associated with the second primary snapshot 204 and not the first primary snapshot 202, a secondary backup corresponding to the first primary snapshot 202 may be analyzed to determine if the created file is present in the secondary backup corresponding to the first primary snapshot 202. Metadata associated with the secondary backup corresponding to the first primary snapshot 202 may indicate whether the created object is present. For example, an index may list the file name associated with the created object or directory name associated with the created object, and a creation timestamp. If present, then the created object is not associated with the second primary snapshot 204 and not included in a secondary backup of the second primary snapshot 204. If the object is not present, then the created object is associated with the second primary snapshot and included in the secondary backup of the second primary snapshot 204.

In the event the identified changed object is an object deletion and the deleted object is included in the directory, then the event corresponding to the object deletion is associated with the third primary snapshot to be performed at a later time. In the event the identified changed object is an object deletion, the deleted object may be associated with the second primary snapshot 204 or the first primary snapshot 202 if the deleted object is not included in the directory. To verify that the deleted object is associated with the second primary snapshot 204 and not the first primary snapshot 202, a secondary backup corresponding to the first primary snapshot 202 may be analyzed to determine if the deleted object is present in the secondary backup corresponding to the first primary snapshot 202. Metadata associated with the secondary backup corresponding to the first primary snapshot 202 may indicate whether the deleted object is present. For example, an index may list the file name associated with the deleted file or a directory name associated with the deleted directory. If present, then the deleted object is associated with the second primary snapshot 204 and is included in a change list corresponding to the secondary backup of the second primary snapshot 204. If the object is not present, then the deleted object is associated with the first primary snapshot 202 and is not included in the change list corresponding to the secondary backup of the second primary snapshot 204.

In the event the identified changed object is an object modification (e.g., the file is written to, or an attribute of the file is set, a directory is modified, metadata of the directory is modified), the modified object may be associated with second primary snapshot 204. An event in the storage log may indicate that an object was modified at a particular point in time that occurred after a capture time associated with the first primary snapshot 202. A directory associated with the object included in the second primary snapshot 204 may be traversed (i.e., either the directory itself or the directory of a file) to verify that the object is present in the second primary snapshot 204. If the object is included in the directory, then the metadata of the object may be inspected to determine a modification timestamp. In some instances, it may not be clear if the modification occurred before or after the second primary snapshot 204. For example, the object may have been modified within the time range of t1 to t3. The metadata of the object included in a secondary backup corresponding to the first primary snapshot 202 may be inspected to determine a modification timestamp. In the event the modification timestamp included in the second primary snapshot 204 matches the modification timestamp included in the secondary backup corresponding to the first primary snapshot 202, then the object modification is determined not to be associated with the second primary snapshot 204 and the modified object is not included in a secondary backup of the second primary snapshot 204. In the event the modification timestamp included in the second primary snapshot 204 does not match the modification timestamp included in the secondary backup corresponding to the first primary snapshot 202, then the object modification is determined to be associated with the second primary snapshot 204 and the modified object is added to a change list. The objects included in the change list are obtained and included in a secondary backup of the second primary snapshot 204.

Identified changed objects that are determined to be associated with the second primary snapshot 204 are added to a change list. The objects included in the change list that are associated with create or modify operations are obtained and included in a secondary backup of the second primary snapshot, that is, an incremental backup of the primary storage system.

FIG. 2B is a diagram illustrating an embodiment of a timeline associated with an incremental backup in accordance with some embodiments. In the example shown, timeline 250 illustrates a first primary snapshot 202 being taken at time t2 and a second primary snapshot 204 being taken at time t5.

The amount of time and resources needed to identify the changed objects to include in the incremental backup may be further reduced by selectively traversing the file directory structures for changed objects that occurred near the previous primary snapshot (e.g., within a first threshold time window 252) and changed objects that occurred near the new primary snapshot (e.g., within a second threshold time window 256). Directories associated with the changed objects that occurred between the first threshold time window 252 and the second threshold time window 256 (i.e., the time window represented by 254) do not need to be traversed because the clock skew between the snapshot service clock and storage log clock is unlikely to be great enough to cause a data integrity problem for these changed objects. The changed objects that occurred between the first threshold time window 252 and the second threshold time window 256 have a high confidence level (e.g., confidence level greater than a threshold confidence level) that they are to be included in a secondary backup of the new primary snapshot.

Threshold time windows 252, 256 may be referred to as a "snapshot time window." In some embodiments, a capture time associated with primary snapshot 202 is a midpoint of threshold time window 252. Time markers t1 and t3 may be an equal amount of time (e.g., 2 minutes) from the capture time associated with primary snapshot 202. In some embodiments, a capture time associated with primary snapshot 204 is a midpoint of threshold time window 256. Time markers t4 and t6 may be an equal amount of time (e.g., 2 minutes) from the capture time associated with primary snapshot 204. In some embodiments, a time marker corresponds to one of the events included in the storage log. For example, time marker t1 may correspond to a last logged event having a timestamp before a capture time associated with primary snapshot 202 and time marker t3 may correspond to a first logged event having a timestamp after the capture time associated with primary snapshot 202. In some embodiments, a first known event (e.g., file creation) is performed (e.g., a first trigger event) to establish a time marker t1 and a second known event (e.g., deletion of the created file) is performed (e.g., a second trigger event) to establish at a time marker t3. The primary snapshot is initiated after the first trigger event has occurred, and the second trigger event is not initiated until the primary backup is completed. Accordingly, it is clear that the primary snapshot occurred at a time that is bounded by the trigger events. In some embodiments, the first known event and the second known event are associated with the same object. In some embodiments, the first known event and the second known event are associated with different objects. The first known event, the second known event, and associated timestamps are recorded in the storage log.

In some embodiments, a length of the threshold time window associated with a primary snapshot is refined. For example, the length of the threshold time window associated with a primary snapshot may be reduced from four minutes (e.g., 11:58 AM-12:02 PM) to two minutes (e.g., 11:59 AM-12:01 PM). This reduces the number of directory traversals performed by a primary system, which reduces the amount of time and resources to generate an incremental backup. The length of the threshold time window associated with a primary snapshot may also be reduced to determine a point in time at which the primary snapshot was performed. The length of the threshold time window associated with a primary snapshot may also be reduced to determine a high confidence time range within which the primary snapshot was performed. For example, a storage log may include 10 events that occurred in between t1 and t3. The length of the time range associated with the primary snapshot may be reduced to the point in time between events #6 and #7.

An event included in threshold time windows 252 and 256 does not have a high confidence level (e.g., confidence level greater than a threshold confidence level) that indicates the event is associated with the second primary snapshot 204. An event included in time window 254 has a high confidence level that indicates the event is associated with the second primary snapshot.

The storage log is analyzed to identify events that occurred in the first threshold time window 252 and the second threshold time window 256. The identified events correspond to changed objects that may be associated with the first primary snapshot 202, the second primary snapshot 204, or a subsequent primary snapshot. The directories associated with the changed objects corresponding to the identified events are traversed to determine whether each of the changed objects is associated with the first primary snapshot 202, the second primary snapshot 204, or the subsequent primary snapshot. Directories associated with changed objects included in the first threshold time window 252 or second threshold time window 256 are traversed because the clock skew between the snapshot service clock and storage log clock may cause a data integrity problem, that is, changed objects included in the first threshold time window 252 or second threshold time window 256 cannot be determined to be included in the new primary snapshot with a high confidence level (e.g., confidence level greater than a threshold confidence level) by using the timestamps of the different clocks. Changed objects that are determined to be associated with the new primary snapshot are added to a change list. The objects included in the change list are obtained and included in an incremental backup of the primary storage system.

The storage log is further analyzed to identify changed objects that occurred in time window 254. The identified events correspond to changed objects that are likely to have been captured by the second primary snapshot 204. The changed objects are aggregated in the change list. Unlike changed objects included in the first and second threshold time windows 252, 256, directories associated with changed objects corresponding to the identified events that occurred in time window 254 do not need to be traversed because the clock skew between the snapshot service clock and storage log clock is unlikely to be great enough to cause a data integrity problem.

A secondary storage system is configured to send to the primary storage system a request for the items included on the change list. In response, the primary storage system is configured to send or provide access to the data and/or metadata associated with the requested changed objects. The secondary storage system is configured to ingest and store the data and/or metadata associated with the requested changed objects.

Figure 3:
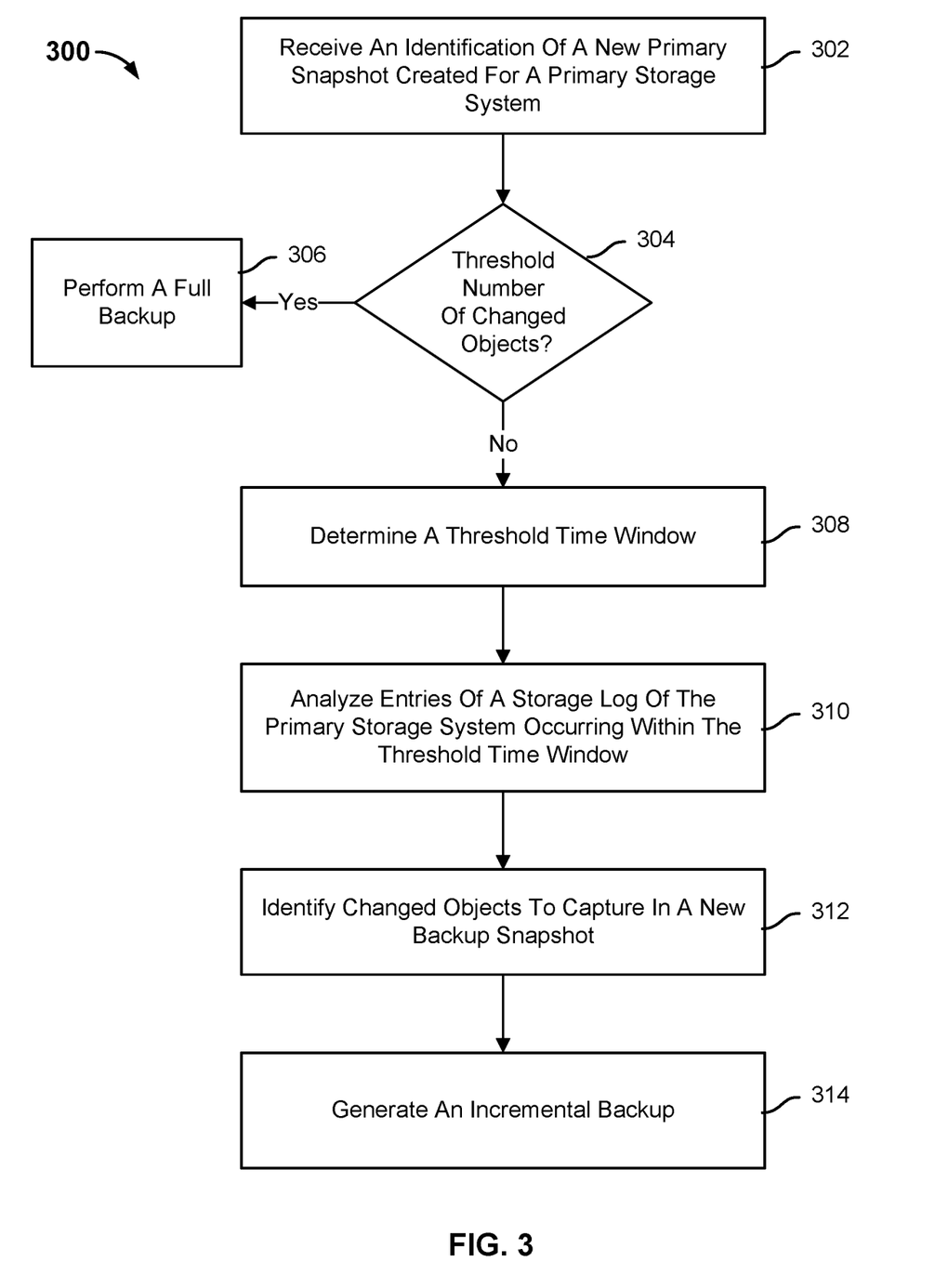
FIG. 3 is a diagram illustrating a process for generating an incremental backup in accordance with some embodiments.

FIG. 3 is a diagram illustrating a process for generating an incremental backup in accordance with some embodiments. In the example shown, process 300 may be implemented by a storage system, such as secondary storage system 112.

At 302, an identification of a new primary snapshot created for a primary storage system is received.

At 304, it is determined whether there is a threshold number of changed objects associated with the new primary snapshot. A storage log associated with the primary storage system may be analyzed to determine the number of changed objects associated with the new primary snapshot. In the event the number of changed objects associated with the new primary snapshot is greater than or equal to the threshold number of changed objects associated with the new primary snapshot, process 300 proceeds to 306. In the event the number of changed objects associated with the new primary snapshot is not greater than the threshold number of changed objects associated with the new primary snapshot, process 300 proceeds to 308.

At 306, a full backup of the new primary snapshot is performed. The storage system requests the primary storage system to provide all of the data associated with the new primary snapshot.

At 308, a threshold time window is determined. In some embodiments, the boundaries associated with the threshold time window include a first point in time based on the storage log clock that occurred before the capture time associated with a previous primary snapshot and a second point in time based on the storage log clock that occurred after the capture time associated with a new primary snapshot. The amount of time between the first point in time and the capture time associated with the previous primary snapshot may be based on an estimated amount of clock skew between a clock associated with the primary snapshots and a clock associated with the storage log. The amount of time between the second point in time and the capture time associated with the new primary snapshot may also be based on the estimated amount of clock skew between the clock associated with the primary snapshots and the clock associated with the storage log.

In some embodiments, a timestamp associated with a first event included in the storage log is selected as the first point in time that occurred before the capture time associated with a previous primary snapshot and a timestamp associated with a second event included in the storage log is selected as the second point in time that occurred after the capture time associated with the new primary snapshot. In some embodiments, the first and second events are associated with the same object. In some embodiments, the first and second events are associated with different objects.

In some embodiments, the threshold time window includes the first point in time that occurred before the capture time associated with the previous primary snapshot and a first point in time that occurred after the capture time associated with the previous primary snapshot. In some embodiments, the threshold time window includes the first point in time that occurred before the capture time associated with the new primary snapshot and the second point in time that occurred after the capture time associated with the new primary snapshot.

At 310, entries of a storage log of the primary storage system occurring within the threshold time window are analyzed to identify changed objects. Some of the entries stored in the storage log correspond to a change event. A change event may occur when an object is created, deleted, modified, and/or moved. Some of the entries included in the storage log correspond to other events associated with the primary storage system, such as when a user logged in, the number of failed login attempts associated with a device, the last time a software update was performed, the last time a password was changed, etc.

At 312, changed objects to capture in a new secondary backup are identified. The new secondary backup is a backup of the new primary snapshot. Entries of the storage log occurring within the threshold time window are analyzed to identify changed objects. Data and/or metadata included in the new secondary backup is backed up to a secondary storage system.

Directories associated with the identified changed objects are added to a list of directories to traverse. In some embodiments, a plurality of the identified changed objects are associated with the same directory. Instead of traversing the same directory a plurality of times, the list of directories to traverse may be deduped to include a single entry that corresponds to the directory that is shared by a plurality of entries. In some embodiments, the entries are deduped in-line (e.g., while the directories are being added to the list) or after the entire list of directories to traverse is completed.

In some embodiments, directories associated with all of the identified changed objects are traversed to verify that the identified changed objects are to be included in a secondary backup of the primary storage system. Identified changed objects that are verified are added to a change list. The objects included in the change list are obtained and included in the secondary backup of the new primary snapshot.

The identified changed objects may be verified to be included in the secondary backup by comparing metadata of the new primary snapshot and metadata of a previous secondary backup to determine for each of the objects of the primary storage system identified as being changed during the threshold time window whether a change to the object since the previous secondary backup is captured in the new primary snapshot.

For example, an event in the storage log may indicate that an object was created at a particular point in time that occurred after a capture time associated with a previous primary snapshot. For a created object, a directory associated with the created object included in the new primary snapshot may be traversed to verify that the created object is present in the new primary snapshot. In some embodiments, the created object is a directory and a top level of the directory is traversed. In some embodiments, the created object is a file and a directory that includes the file is traversed. If the object is not included in the directory (e.g., the top level of the directory does not exist or the file does not exist) and there are no other entries related to that object in the storage log, then the new primary snapshot was generated before the event and the new object is not included in the secondary backup of the primary storage system. If the created object is included in the directory, then the new primary snapshot was generated after the event.

However, it is not clear if the object was created before the previous primary snapshot (e.g., between t1 and t2 of FIGS. 2A, 2B) or after the previous primary snapshot (e.g., between t2 and t3 of FIGS. 2A, 2B). That is, it is not clear if the object should be included in the secondary backup. A secondary backup corresponding to the previous primary snapshot may be analyzed to determine if the object was created before the previous primary snapshot or after the previous primary snapshot. Metadata associated with the secondary backup corresponding to the previous primary snapshot may indicate whether the created object is present. For example, an index may list the file name associated with the created file or a directory name associated with a created object, and a creation timestamp. If present and there are no delete or create entries associated with the object in the storage log, then the created object is not associated with the new primary snapshot and not added to a change list of changed objects to include in a secondary backup of the new primary snapshot. If the object is not present, then the created object is associated with the new primary snapshot, added to the change list, and included in the secondary backup of the new primary snapshot.

In another example, an event in the storage log may indicate that an object was deleted at a particular point in time that occurred after a capture time associated with a previous primary snapshot. A directory associated with the object included in the new primary snapshot may be traversed (e.g., a top level of the directory or the directory of a file) to verify that the object is not present in the new primary snapshot. If the object is included in the directory, then the new primary snapshot was generated before the event (e.g., the object was deleted after t3 of FIG. 2A or deleted after t5 of FIG. 2B, or deleted before t2 of FIGS. 2A, 2B so long as there are not subsequent create operations for an object having the same name as the deleted object) and a changed object indicating the object deletion would not be included in the secondary backup of the new primary snapshot. If the object is not included in the directory, then the new primary snapshot was generated after the event (e.g., the object was deleted before t3 of FIG. 2A or t5 of FIG. 2B).

However, it is unclear if the object was deleted before or after the previous primary snapshot (e.g., before or after t2 of FIGS. 2A, 2B). A secondary backup corresponding to the previous primary snapshot may be analyzed to determine if the object was deleted before the previous primary snapshot or after the previous primary snapshot. Metadata associated with the secondary backup corresponding to the previous primary snapshot may indicate whether the deleted object is present. For example, an index may list the file name associated with the deleted file or a directory name associated with the deleted directory. If present, then the deleted object is associated with the new primary snapshot and is added to a change list of changed objects. If the object is not present, then the deleted object is associated with the previous primary snapshot and is not added to the change list of changed objects.

In another example, an event in the storage log may indicate that an object was modified at a particular point in time that occurred after a capture time associated with a previous primary snapshot. A directory associated with the object included in the new primary snapshot may be traversed (i.e., a top level of the directory or the directory of a file) to verify that the object is present in the new primary snapshot. If the object is included in the directory, then the metadata of the object may be inspected to determine a modification timestamp. In some instances, it may not be clear if the modification occurred before or after the second primary snapshot 204. For example, the object may have been modified within the time range of t1 to t3 of FIG. 2B. The metadata of the file included in a secondary backup corresponding to a previous primary snapshot may be inspected to determine a modification timestamp. In the event the modification timestamp included in the new primary snapshot matches the modification timestamp included in the secondary backup corresponding to the previous primary snapshot, then the object modification is determined not to be associated with the new primary snapshot and the modified object is not included in a secondary backup of the new primary snapshot. In the event the modification timestamp included in the new primary snapshot does not match the modification timestamp included in the secondary backup corresponding to the previous primary snapshot and there are no subsequent delete entries associated with the object in the storage log, then the object modification is determined to be associated with the new primary snapshot and the modified object is included in a secondary backup of the new primary snapshot.

In some embodiments, the amount of time and resources needed to generate the incremental backup is further reduced by selectively traversing the file directory structures for changed objects that occurred near the previous primary snapshot (e.g., within a first threshold time window) and changed objects that occurred near the new primary snapshot (e.g., within a second threshold time window). Directories associated with the changed objects that occurred between the first threshold time window and the second threshold time window do not need to be traversed because the clock skew between the snapshot service clock and storage log clock is unlikely to be great enough to cause a data integrity problem for these changed objects. The changed objects that occurred between the first threshold time window and the second threshold time window have a high confidence level (e.g., confidence level greater than a threshold confidence level) that they are to be included in a secondary backup of the new primary snapshot.

The first threshold time window corresponds to events that occurred near the previous primary snapshot. The first threshold time window includes a pre-marker that occurred before a capture time associated with the previous primary snapshot and a post-marker that occurred after the capture time associated with the previous primary snapshot. The markers provide consistency points for enabling correlation of the relevant storage log events and the primary snapshot from which data is being backed up.

Events included in the first threshold time window correspond to events that do not have a high confidence level that indicates the event is associated with the new primary snapshot. Directories of changed objects included in the first threshold time window are traversed to verify that the identified changed objects are to be included in a secondary backup of the primary storage system. Identified changed objects that are verified are added to a change list of changed objects and included in the secondary backup of the new primary snapshot.

The second threshold time window corresponds to events that occurred near the new primary snapshot. The second threshold time window includes a pre-marker that occurred before a capture time associated with the new primary snapshot and a post-marker that occurred after the capture time associated with the new primary snapshot. The markers provide consistency points for enabling correlation of the relevant storage log events and the primary snapshot from which data is being backed up.

Events included in the second threshold time window correspond to events that do not have a high confidence level that indicates the event is associated with the new primary snapshot. Directories of changed objects included in the second threshold time window are traversed to verify that the identified changed objects are to be included in a secondary backup of the primary storage system. Identified changed objects that are verified are added to a change list of changed objects. The objects included in the change list that are associated with create or modify operations are obtained and included in the secondary backup of the new primary snapshot. Objects included in the change list that are associated with delete or move operations are not obtained, but an indication of the delete or move operations is stored. The secondary storage system may use the indication to update its own metadata that represents a state of the primary storage system at a point in time corresponding to the new primary snapshot.

The storage log is further analyzed to identify events that occurred between the first and second threshold time windows. The identified events correspond to changed objects that are likely to have been captured by the new primary snapshot. The changed objects are aggregated in the change list. Unlike changed objects included in the first and second threshold time windows, directories associated with changed objects corresponding to the identified events that occurred between the first and second threshold time windows do not need to be traversed because the clock skew between the snapshot service clock and storage log clock is unlikely to be great enough to cause a data integrity problem.

At 314, an incremental backup of the primary storage system is generated. The secondary backup of the new primary snapshot is the incremental backup of the primary storage system and includes identified changed objects that are determined to be associated with the new primary snapshot. A secondary storage system is configured to send to the primary storage system a request for the identified changed objects. In response, the primary storage system is configured to send or provide access to the data and/or metadata associated with the identified changed objects. In response to receiving the data and/or metadata associated with the identified changed objects, the secondary storage system is configured to ingest and store the received data and/or metadata.

Figure 4:
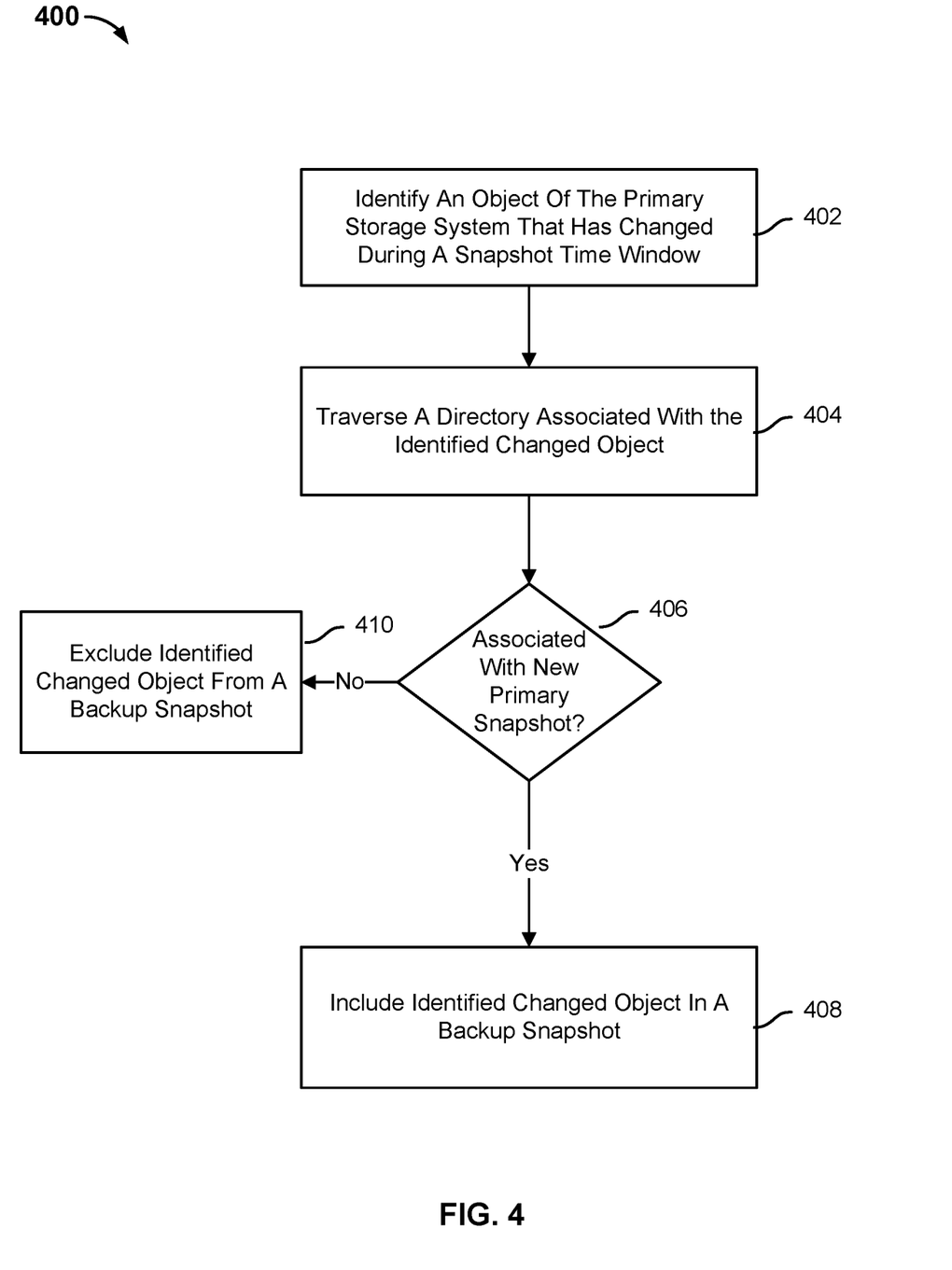
FIG. 4 is a diagram illustrating a process for identifying changed objects to include in an incremental backup in accordance with some embodiments.

FIG. 4 is a diagram illustrating a process for identifying changed objects to include in an incremental backup in accordance with some embodiments. In the example shown, process 400 may be implemented by a storage system, such as secondary storage system 112. In some embodiments, process 400 is implemented to perform some of step 312 of process 300.

At 402, an object of the primary storage system that has changed during a snapshot time window is identified. A snapshot time window corresponds to a time near a primary snapshot. The boundaries of the snapshot time window include a pre-marker that occurs before a primary snapshot, such as pre-markers occurring at times t1 and t4 of FIG. 2B, and a post-marker that occurs after a primary snapshot, such as post-markers occurring at time t3 and t6 of FIG. 2B. A changed object is identified by analyzing a storage log and determining whether a timestamp associated with the changed object occurred within the snapshot time window. In some embodiments, the changed object is a created file, a deleted file, a modified file (e.g., data of the file was modified, an attribute of the file was modified), a moved file, or a combination thereof. In some embodiments, the changed object is a created directory, a deleted directory, a moved directory, or a combination thereof.

Directories associated with the identified changed objects are added to a list of directories to traverse. In some embodiments, a plurality of the identified changed objects are associated with the same directory. Instead of traversing the same directory a plurality of times, the list of directories to traverse may be deduped to include a single entry that corresponds to the directory that is shared by a plurality of entries. In some embodiments, the entries are deduped in-line (e.g., while the directories are being added to the list) or after the entire list of directories to traverse is completed.

At 404, a directory associated with the identified changed object is traversed. A primary snapshot includes a file directory structure. The file directory structure of the primary snapshot is traversed to determine whether the identified changed object is associated with a new primary snapshot. In some embodiments, the identified changed object is a directory and a top level of the directory is traversed. In some embodiments, the identified changed object is a file and a directory that includes the file is traversed.

At 406, it is determined whether the identified changed object is associated with a new primary snapshot based on the directory traversal. An identified changed object is associated with the new primary snapshot in the event the change to the identified changed object occurred after a previous primary snapshot and before the new primary snapshot.

In the event it is determined that the identified changed object is associated with the new primary snapshot, process 400 proceeds to 408 where the identified changed object is included in a secondary backup of the new primary snapshot. In the event it is determined that the identified changed object is not associated with the new primary snapshot, process 400 proceeds to 410 where the identified changed object is excluded from the secondary backup of the new primary snapshot.

Figure 5:
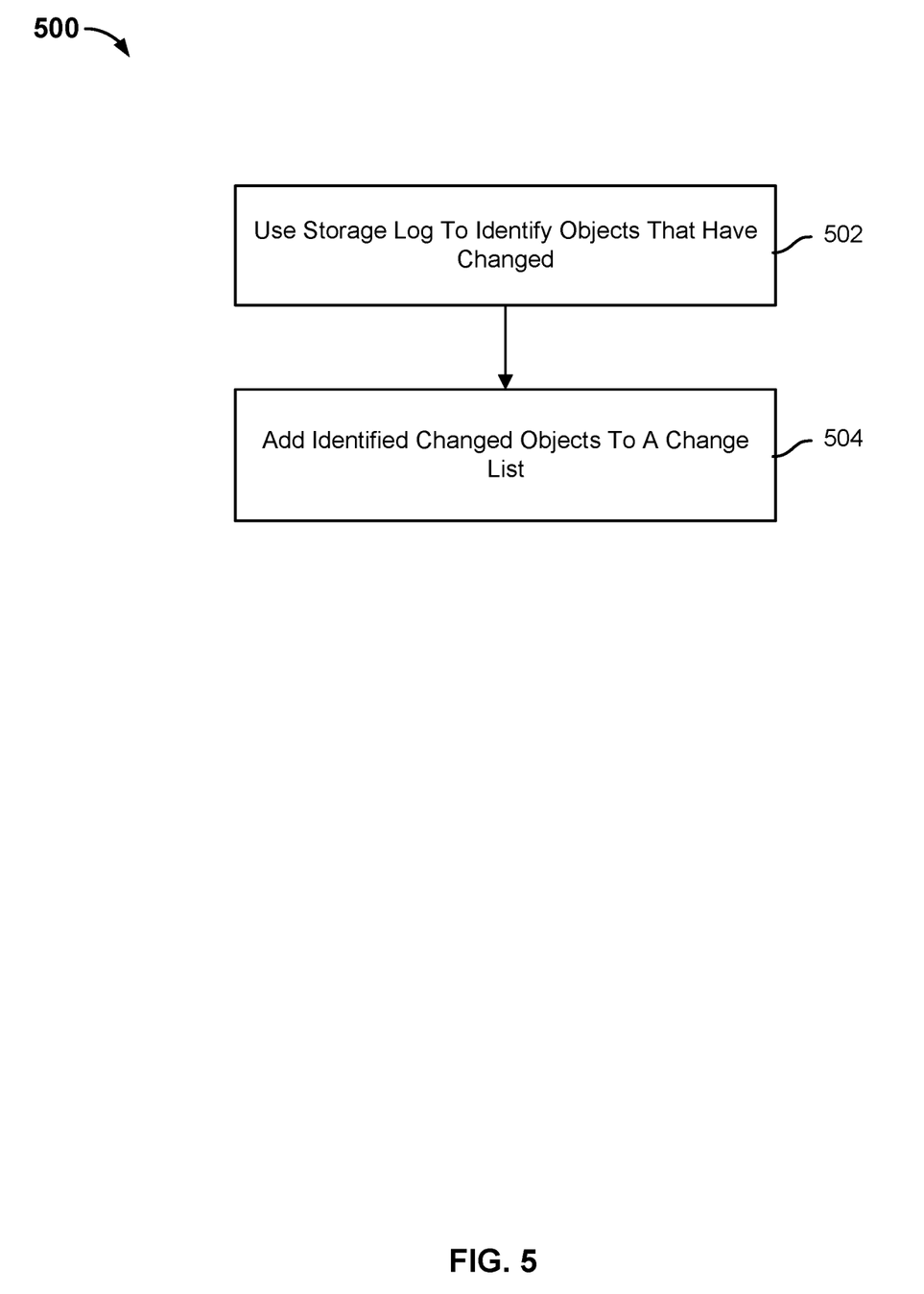
FIG. 5 is a diagram illustrating a process for identifying changed objects to include in an incremental backup in accordance with some embodiments.

FIG. 5 is a diagram illustrating a process for identifying changed objects to include in an incremental backup in accordance with some embodiments. In the example shown, process 500 may be implemented by a storage system, such as secondary storage system 112. In some embodiments, process 500 is implemented to perform some of step 312 of process 300.

At 502, a storage log is used to identify objects that have changed. The storage log may be used to identify objects that have changed for events that occurred between snapshot time windows, such as between post-time marker t3 and pre-time marker t4 of FIG. 2B. Identified changed objects included between snapshot time windows have a high confidence level that indicates the identified changed objects are associated with a new secondary backup. At 504, the identified changed objects are added to a change list that indicates one or more changed objects that are to be included in a secondary backup.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving an identification of a new primary snapshot created for a primary storage system;
determining a threshold time window based on a capture time associated with the new primary snapshot, wherein:
the capture time is generated using a snapshot service clock;
the threshold time window includes a pre-new primary snapshot marker and a post-new primary snapshot marker;
the pre-new primary snapshot marker corresponds to a first event in a storage log before the capture time;
the pre-new primary snapshot marker is determined based on a storage log clock, wherein the snapshot service clock is different from the storage log clock;
the post-new primary snapshot marker is determined based on the storage log clock; and
the post-new primary snapshot marker corresponds to a second event in the storage log after the capture time;
analyzing entries of the storage log of the primary storage system occurring within the threshold time window to identify any objects of the primary storage system that have changed during the threshold time window; and
identifying changed objects to capture in a new secondary backup stored at a secondary storage system and corresponding to the new primary snapshot, including by comparing metadata of the new primary snapshot and metadata of a previous secondary backup to determine for each of the objects of the primary storage system identified as having changed during the threshold time window whether a change to an object since the previous secondary backup is captured in the new primary snapshot, wherein the identifying of the changed objects comprises:
in response to determining that a timestamp of the snapshot service clock differs from a corresponding timestamp of the storage log clock, traversing a corresponding directory of the new primary snapshot that is associated with a changed object of the changed objects.

2. The method of claim 1, further comprising generating an incremental backup of the primary storage system based on the identified changed objects, wherein the incremental backup of the primary storage system is the new secondary backup of the new primary snapshot.

3. The method of claim 1, wherein the changed objects include at least one of a created file, a deleted file, a modified file, a moved file, a created directory, a deleted directory, and/or a moved directory.

4. The method of claim 1, wherein the capture time associated with the new primary snapshot is not reflected in the storage log.

5. The method of claim 1, wherein identifying the changed objects to capture in the new secondary backup includes adding to a change list the changed objects that are determined to be captured in the new primary snapshot.

6. The method of claim 1, wherein the primary storage system is a network-attached storage device.

7. The method of claim 1, further comprising determining a second threshold time window based on a capture time associated with a previous primary snapshot.

8. The method of claim 7, wherein timestamps associated with the pre-new primary snapshot marker and the post-new primary snapshot marker are based on the storage log clock.

9. The method of claim 8, wherein the second threshold time window includes a pre-previous primary snapshot marker and a post-previous primary snapshot marker, wherein timestamps associated with the pre-previous primary snapshot marker and the post-previous primary snapshot marker are based on the storage log clock.

10. The method of claim 9, further comprising adding to a change list objects identified as occurring within the threshold time window or the second threshold time window that are verified as being associated with the new primary snapshot.

11. The method of claim 10, further comprising adding to the change list objects of the primary storage system that have changed between the threshold time window and the second threshold time window.

12. The method of claim 1, further comprising determining whether a number of the identified changed objects of the primary storage system that have changed during the threshold time window is greater than a threshold number of objects.

13. The method of claim 12, further comprising performing a full backup of the new primary snapshot in response to determining that the number of the identified changed objects of the primary storage system that have changed during the threshold time window is greater than the threshold number of objects.

14. The method of claim 12, wherein in response to determining that the number of the identified changed objects of the primary storage system that have changed during the threshold time window is not greater than the threshold number of objects, identifying the changed objects to capture in the new secondary backup stored at the secondary storage system and corresponding to the new primary snapshot.

15. A computer program product embodied in a non-transitory computer readable medium and comprising computer instructions for:
receiving an identification of a new primary snapshot created for a primary storage system;
determining a threshold time window based on a capture time associated with the new primary snapshot, wherein:
the capture time is generated using a snapshot service clock;
the threshold time window includes a pre-new primary snapshot marker and a post-new primary snapshot marker;
the pre-new primary snapshot marker corresponds to a first event in a storage log before the capture time;
the pre-new primary snapshot marker is determined based on a storage log; clock, wherein the snapshot service clock is different from the storage log clock;
the post-new primary snapshot marker is determined based on the storage log clock; and
the post-new primary snapshot marker corresponds to a second event in the storage log after the capture time;
analyzing entries of the storage log of the primary storage system occurring within the threshold time window to identify any objects of the primary storage system that have changed during the threshold time window; and
identifying changed objects to capture in a new secondary backup stored at a secondary storage system and corresponding to the new primary snapshot, including by comparing metadata of the new primary snapshot and metadata of a previous secondary backup to determine for each of the objects of the primary storage system identified as having changed during the threshold time window whether a change to an object since the previous secondary backup is captured in the new primary snapshot, wherein the identifying of the changed objects comprises:

in response to determining that a timestamp of the snapshot service clock differs from a corresponding timestamp of the storage log clock, traversing a corresponding directory of the new primary snapshot that is associated with a changed object of the changed objects.

16. A system, comprising:

a processor configured to:

receive an identification of a new primary snapshot created for a primary storage system;

determine a threshold time window based on a capture time associated with the new primary snapshot, wherein:

the capture time is generated using a snapshot service clock;

the threshold time window includes a pre-new primary snapshot marker and a post-new primary snapshot marker;

the pre-new primary snapshot marker corresponds to a first event in a storage log before the capture time;

the pre-new primary snapshot marker is determined based on a storage log clock, wherein the snapshot service clock is different from the storage log clock;

the post-new primary snapshot marker is determined based on the storage log clock; and the post-new primary snapshot marker corresponds to a second event in the storage log after the capture time;

analyze entries of the storage log of the primary storage system occurring within the threshold time window to identify any objects of the primary storage system that have changed during the threshold time window; and identify changed objects to capture in a new secondary backup stored at a secondary storage system and corresponding to the new primary snapshot, including by comparing metadata of the new primary snapshot and metadata of a previous secondary backup to determine for each of the objects of the primary storage system identified as having changed during the threshold time window whether a change to an object since the previous secondary backup is captured in the new primary snapshot, wherein the identifying of the changed objects comprises to:

in response to determining that a timestamp of the snapshot service clock differs from a corresponding timestamp of the storage log clock, traverse a corresponding directory of the new primary snapshot that is associated with a changed object of the changed objects; and a memory coupled to the processor and configured to provide the processor with instructions.

* * * * *